(12) United States Patent
Johnson et al.

(10) Patent No.: US 10,809,445 B2
(45) Date of Patent: Oct. 20, 2020

(54) LIGHT CONTROL FILM FOR DISPLAY ASSEMBLIES

(71) Applicant: 3M INNOVATIVE PROPERTIES COMPANY, St. Paul, MN (US)

(72) Inventors: Nicholas A. Johnson, Burnsville, MN (US); Richard V. Pallarino, Stillwater, MN (US); Kenneth A. Epstein, St. Paul, MN (US); Michael E. Lauters, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/475,441

(22) PCT Filed: Jan. 3, 2018

(86) PCT No.: PCT/US2018/012228
§ 371 (c)(1),
(2) Date: Jul. 2, 2019

(87) PCT Pub. No.: WO2018/129073
PCT Pub. Date: Jul. 12, 2018

(65) Prior Publication Data
US 2019/0346615 A1    Nov. 14, 2019

Related U.S. Application Data

(60) Provisional application No. 62/442,341, filed on Jan. 4, 2017.

(51) Int. Cl.
*G02B 6/00* (2006.01)
*F21V 8/00* (2006.01)
(Continued)

(52) U.S. Cl.
CPC ............ *G02B 6/0053* (2013.01); *G02B 5/045* (2013.01); *G02B 5/223* (2013.01); *G02B 6/0051* (2013.01)

(58) Field of Classification Search
CPC .... G02B 6/0053; G02B 6/0051; G02B 5/045; G02B 5/223
See application file for complete search history.

(56) References Cited

U.S. PATENT DOCUMENTS

| 2010/0214506 A1 | 8/2010 | Gaides |
| 2014/0204464 A1 | 7/2014 | Halverson |
| (Continued) | | |

FOREIGN PATENT DOCUMENTS

| CN | 202939323 | 5/2013 |
| JP | 2008-122850 | 5/2008 |
| (Continued) | | |

OTHER PUBLICATIONS

International Search Report for PCT International Application No. PCT/US2018/012228, dated Apr. 29, 2018, 5pgs.

*Primary Examiner* — Anne M Hines
(74) *Attorney, Agent, or Firm* — Lisa P. Fulton

(57) ABSTRACT

A light control film and display assemblies that includes such a film. The light control film including a substrate defining first and second major surfaces with the first major surface including a plurality louvers spanning in a first direction substantially perpendicular to a normal of the first major surface, and with the second major surface comprises a plurality of linear microstructures spanning in the first direction. In some examples, each louver of the plurality of louvers substantially aligns with a corresponding microstructure of the plurality of microstructures.

24 Claims, 8 Drawing Sheets

(51) Int. Cl.
*G02B 5/04* (2006.01)
*G02B 5/22* (2006.01)

(56) References Cited

U.S. PATENT DOCUMENTS

2016/0025919 A1   1/2016  Boyd
2016/0124126 A1*  5/2016  Vasylyev ............... G02B 5/003
                                                             359/893

FOREIGN PATENT DOCUMENTS

| | | |
|---|---|---|
| JP | 2008-175975 | 7/2008 |
| JP | 2014-235397 | 12/2014 |
| KR | 2011-0064285 | 6/2011 |
| WO | 2007-118122 | 10/2007 |
| WO | 2016-003669 | 1/2016 |
| WO | 2018-129068 | 7/2018 |

* cited by examiner

LIGHT CONTROL FILM FOR DISPLAY ASSEMBLIES

FIELD OF TECHNOLOGY

The disclosure relates to light controlling films and display assemblies that include the same. Such films and display assemblies may be used, for example, in automotive displays.

BACKGROUND

Optical displays are widely used for lap-top computers, hand-held calculators, digital watches, automotive touch-screen displays, and the like. The familiar liquid crystal display (LCD) is a common example of such an optical display. In the LCD display, portions of the liquid crystal have their optical state altered by the application of an electric field. This process generates the contrast necessary to display "pixels" of information. In some examples, the LCD displays may include combinations of various light control films to modify the light properties of the display assembly, including for example brightness or output distributions.

SUMMARY

Some examples of the present disclosure include a light control film that includes a substrate defining first and second major surfaces with the first major surface including a plurality louvers spanning in a first direction substantially perpendicular to a normal of the first major surface, and with the second major surface comprises a plurality of linear microstructures spanning in the first direction.

Some examples of the present disclosure include a display assembly that includes a backlight defining a light output surface and a light control film disposed adjacent to the light output surface, the light control film including a substrate defining first and second major surfaces, where the first major surface includes a plurality louvers spanning in a first direction substantially perpendicular to a normal of the first major surface, where the second major surface includes a plurality of linear microstructures spanning in the first direction, where light from the backlight exits the light output surface and enters the second major surface of the light control film and exits through the first major surface.

Some examples of the present disclosure describe a technique for forming a light control film, the techniques includes forming a plurality of slots on a first surface of a polymeric material, forming a plurality of linear microstructures on a second major surface of the polymeric material, curing the polymeric material, and backfilling the slots with a light absorbing material to from a plurality of louvers on the second major surface.

The details of one or more examples of the disclosure are set forth in the accompanying drawings and the description below. Other features, objects, and advantages of the disclosure will be apparent from the description and drawings, and from the claims.

DETAILED DESCRIPTION

In some examples, the disclosure describes light control films (LCF) and display assemblies that include the same. The described LCFs may include a plurality of linear microstructures and louvers on opposite sides of the film. The microstructures and louvers may be registered to one another such that each louver is aligned with a corresponding microstructure. Such LCFs may be used to control the angle of light output distribution within a desired plane of a display assembly, such as an automotive display unit or private viewing screen. The LCF may be used to regulate or narrow the optical output distribution within the specified viewing plane to prevent or otherwise limit the projection of a display image into undesired directions. For example, in the case of automotive display units, the described LCFs may be used to limit the optical output distribution of the display unit within the vertical plane to prevent stray projection of light towards reflective surfaces such as the windshield of the automobile.

In some examples, the LCFs and display assemblies described herein may be used to form display units with enhanced brightness characteristics and regulated optical output distributions. For example, by registering each louver of the described LCF films with a corresponding microstructure, the film may be more efficient at transporting light through the LCF within a desired angular output distribution as compared to a display assembly that uses either a microstructure turning film or louver film independently, or the combination of films in an otherwise non-registered alignment.

Figure 1:
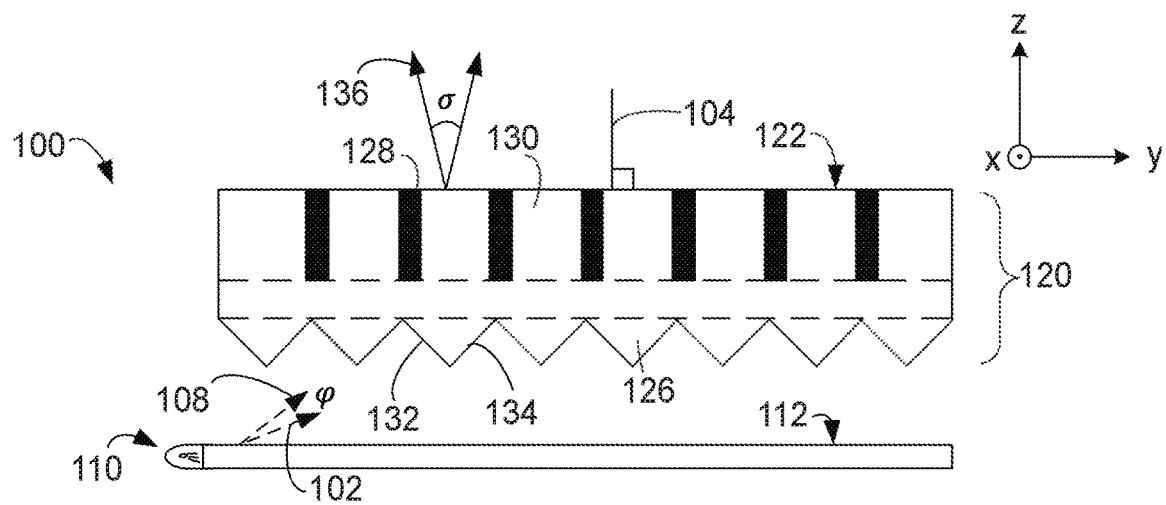
FIG. 1 is a schematic side elevation cross-section of an example display assembly that includes a light source and a light control film (LCF) having louvers and microstructures on opposites sides of the film positioned adjacent to light source.
Figure 2:
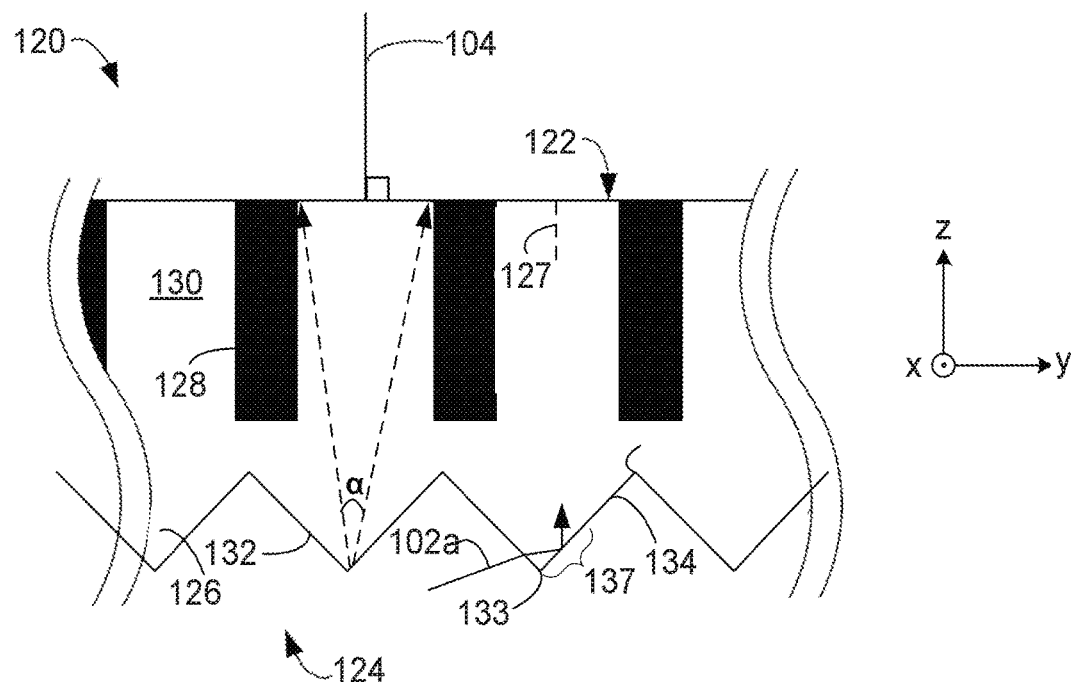
FIG. 2 is an enlarged view of the LCF of FIG. 1 for illustrating several of the features of the LCF.

FIG. 1 is a schematic side elevation cross-section of an example display assembly 100 that includes a light source 110 and a LCF 120 positioned adjacent to light source 110. FIG. 2 provides an enlarged view of LCF 120 for illustrating several of the features of LCF 120. As shown in FIGS. 1 and 2, LCF 120 defines a first major surface 122 that is substantially smooth (e.g., non-structured) that includes a plurality of louvers 128 (e.g., light absorptive regions) each separated by a region of light transmissive material 130. Opposite of first major surface 122 is second major surface 124 that includes a plurality of linear microstructures 126 (e.g., prisms) with each microstructure 126 having a first side 132 and second side 134 configured to refract and reflect light from light source 110 and redirect the light towards first major surface 122. Each louver 128 is registered to a corresponding microstructure 126 such that louvers 128 and microstructures 126 are substantially aligned and span in substantially the same direction, e.g., the direction of the x-axis and occur in substantially the same (e.g., the same or nearly the same) repeating frequency. As described further below, louvers 128 may be registered so that the placement of microstructures 126 and louvers 128 is optimized to allow the light redirected by microstructures 126 within a desired viewing angle to pass through regions of transmissive material 130.

In some examples, the inclusion of LCF 120 in display assembly 100 may provide a highly efficient mechanism for controlling the light output distribution (e.g., collimation angle) within the y-z plane. For example, during operation of display assembly 100, light source 110 will generate light rays 102, which enter LCF 120 through first side 132 of microstructures 126. As light rays 102 passes through microstructures 126, light rays 102 will undergo refraction off first side 132 and reflection off second side 134 of a respective microstructure 126. The net result causes the light rays 102 to turn within the y-z plane towards the normal 104 (e.g., z-axis) of first major surface 122. As described herein, by "normal" to a surface is meant perpendicular to the major plane of the surface, discounting any local variation in surface smoothness. In some examples, normal 104 may represent the display axis of display assembly 100.

The light rays 102 then transmit through regions of transmissive material 130 before exiting LCF 120 at first major surface 122. In some examples, the light exiting first major surface 122 may be collimated within light output distribution 136 characterized by a y-z collimation angle (σ). Light output distribution 136 represents the sum of the light exiting first major surface 122 of LCF 120. In some examples, light output distribution 136 may define a first set of characteristic viewing angles as viewed within the y-z plane. In some examples, LCF 120 may be used to from a light output distribution between about −10 degrees and about +20 within the y-z plane as measured from normal 104, corresponding to a y-z collimation angle (σ) of about 30 degrees.

In some examples, light rays 102 emitted from light source 110 and entering LCF 120 may be initially collimated within light distribution cone 108, characterized by distribution angle (φ), and directed towards the first side 132 of the respective microstructures 126. The light transmitted through microstructures 126 may remain mostly collimated such that the light passes through light transmissive material 130 and exits LCF 120 within light output distribution 136, unaffected by louvers 128. However, due to unintentional reflections, refractions, or dispersions; inefficient light sources; improper alignments; or the like, at least some of the light rays 102 originating from light source 110 may be partially de-collimated creating stray light rays that pass through microstructures 126 and LCF 120 at oblique or otherwise less desirable viewing angles (e.g., angles outside of desired light output distribution 136).

In certain applications including, for example, automotive display units or private viewing screens, such stray light rays may cause images to be projected at less desirable viewing angles. For example, in examples where display assembly 100 represents an automotive display unit, the y-z plane may represent the vertical plane within the automobile. If the display unit generated stray light rays within the vertical plane (e.g., within the y-z plane of FIG. 1), some of those stray light rays may become reflected off the windshield and be redirected towards an occupant of the vehicle. During low-light driving conditions, such unintended reflections may become a distraction to the occupant.

By including louvers 128 and registering each louver with a respective microstructure 126, louvers 128 may provide a mechanism of blocking such stray light rays from exiting through first major surface 122. For example, louvers 128 may be characterized as regions or slats of light absorbing material (e.g., non-transmissive regions) separated from an adjacent louver 128 by a region of transmissive material 130 to form alternating regions of transmissive material and absorptive material. Due to the shape, orientation, and distance between adjacent louvers 128, only light transmitting through transmissive material 130 within a specified y-z transmission angle (α) will be pass through LCF 120 with all other light (e.g., stray light rays within the y-z plane traveling through LCF 120 at angles outside of y-z collimation angle (σ)) being absorbed by louvers 128.

In some examples, by registering louvers 128 with microstructures 126, substantially all the light (e.g., at least about 85% of the light) reflected by second side 134 and maintained within the angle (σ) of light output distribution 136, may be transmitted through LCF 120 without being absorbed unintentionally by louvers 128. The net result of registering louvers 128 to microstructures 126 may therefore both preserve and efficiently transfer desirable light within light output distribution 136 through LCF 120 while substantially eliminating (e.g., eliminate or nearly eliminate) stray light outside of angle (σ) of light output distribution 136 from exiting first major surface 122. In some examples, LCF 120 may allow for at least 85% of the light originating from light source 110 to exit through first major surface 122, with at least 90% of that light contained within light output distribution 136. In some examples, the LCF 120 may exhibit an improved brightness compared to a system that includes only a louver film as more of the light is redirected within light output distribution 136 and made available to the viewer.

In some examples, louvers 128 may be registered to microstructures 126 to increase the amount of light reflected by second side 134 passing through transmissive material 130 that exits LCF 120 within angle (σ) of light output distribution 136. The final alignment may depend on several factors including, for example, angle (σ) of light output distribution 136, size and shape of louvers 128, primary reflection axis of the light reflected off second side 134, and the like. In some non-limiting examples, each louver 128 may be aligned with the valley 135 of corresponding microstructures 126 along the axis of normal 104. Additionally or alternatively, louvers 128 and microstructures 126 may be registered such that a point along a portion 137 of the reflecting side (e.g., second side 134) of each microstructure 126 may be aligned with the center of a corresponding region of transmissive material 130. For example, as shown in FIG. 2, representative light ray 102a is shown entering a respective microstructure 126 and reflecting off portion 137 of second side 134 and redirected towards first major surface 122. Due to the construction of display assembly 100, the vast majority of the light entering a respective microstructure 126 will be reflected off the upper half (e.g., from peak 133 to half-way between peak 133 and valley 135 of a respective microstructure) of second side 134. Portion 137 may represent therefore represent the reflective upper half of second side 134. Any point on portion 137 (e.g., the middle of portion 137) may be aligned with the center 127 of the corresponding region of transmissive material 130.

In some examples, registering louvers 128 with microstructures 126 as described above may improve the amount of light transmitted through LCF 120 compared to a comparable film having louvers 128 and microstructures 126, but lacking the described registration. For examples, by failing to register louvers 128 and microstructures 126 with one another, some of the light within desired light output distribution 136 may be undesirably absorbed by louvers 128 resulting in a reduction in light transmitted through the LCF. In some examples, registering louvers 128 with microstructures 126 may reduce the amount of light absorbed by louvers 128 from about 35% absorbance (e.g., non-registered) to about 11% absorbance (e.g., registered).

Figure 3:
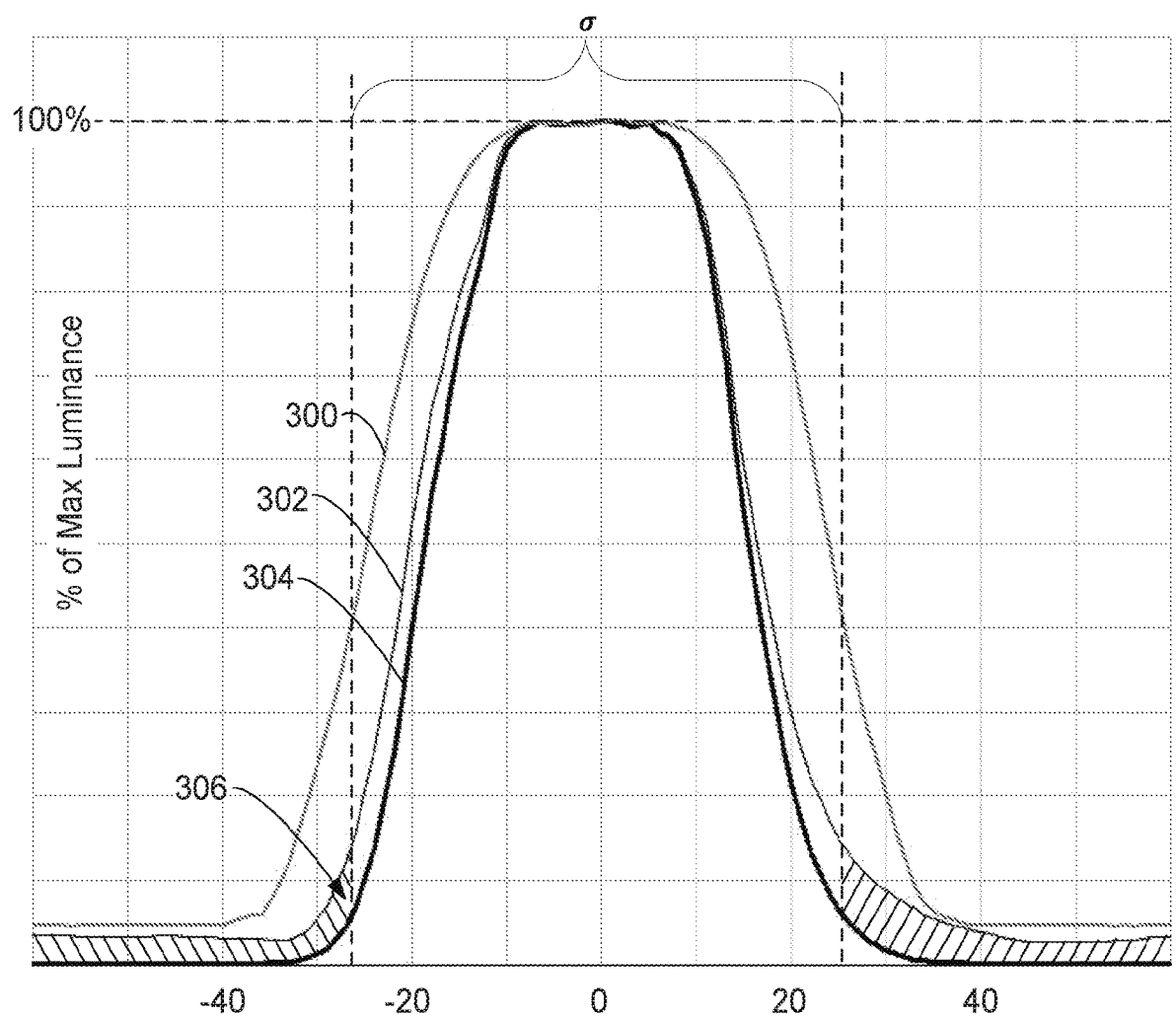
FIG. 3 is an example plot of the light output distribution for an example display assembly.

LCF 120 may also provide an improved edge cut-off (e.g., reduction of light transmitted within off-axis viewing angles) compared to either a louver film or turning film used independently. For example, FIG. 3 is an example plot of a light output distributions for display assemblies including one or more LCF films showing the intensity (e.g., % of maximum luminance) of the light output as a function of viewing angle (e.g., within the y-z plane of FIG. 1). Curve 300 represents the light output distribution of a LCF film having a plurality of louvers (e.g., similar to louvers 128) but lacks the presence of registered microstructures (e.g., a louver only LCF). Curve 302 represents the light output distribution of a LCF film having a plurality of microstructures (e.g., similar to microstructures 126) but lacks the presence of registered louvers. Curve 304 represents the light output distribution of a LCF similar to LCF 120 having a plurality of microstructures 126 registered to a plurality of louvers 128.

As shown by curves 300 and 302 (the louver only and microstructure only films), while having mostly collimated within light output distribution angle ($\sigma$), still include some degree of stray light passing through the respective film at oblique angles (e.g., the curves exhibit some luminance in regions 306). As shown by curve 304, the presence of both louvers 128 and registered microstructures 126 may provide better effectively of absorbing light within regions 306 (e.g., outside of y-z collimation angle ($\sigma$)) compared to either a louver or microstructure film independently, thereby blocking such light from exiting first major surface 122 of LCF 120 and permitting only light within output distribution angle ($\sigma$) from being transmitted through first major surface 122. In some examples, the resulting output distribution angle ($\sigma$) may correspond to a set of characteristic viewing angles within the y-z plane for display assembly 100. In some examples, the y-z characteristic viewing angles may be less than about ±70 degrees as measured from normal 104 of first major surface 122, for example, less than about ±35 degrees, less than about ±20 degrees, or less than about ±10 degrees. In some examples, a characteristic viewing angle may be characterized as a viewing angle in which the luminance from display assembly 100 observed at that angle is at least above 5% of the maximum luminance value.

In some examples, the characteristic viewing angles described herein may be characterized by the viewing half-angle about the normal (e.g., normal 104) or display axis of the system. For example, if LCF 120 defined a set of y-z characteristic viewing angles includes ±70 degrees with respect to normal 104 of major surface 122 (e.g., viewing angles that span from −70 degrees to +70 degrees in the y-z plane, with 0 degrees representing normal 104), the y-z characteristic viewing angles may likewise be characterized as having a 70 degree viewing half-angle. In some examples, the y-z characteristic viewing angles of assembly 100 may define a viewing half-angle of at least 10 degrees and less than 70 degrees. In some examples, the y-z characteristic viewing angles of assembly 100 may define a viewing half-angle of at least 20 degrees and less than 35 degrees.

Figure 4A:
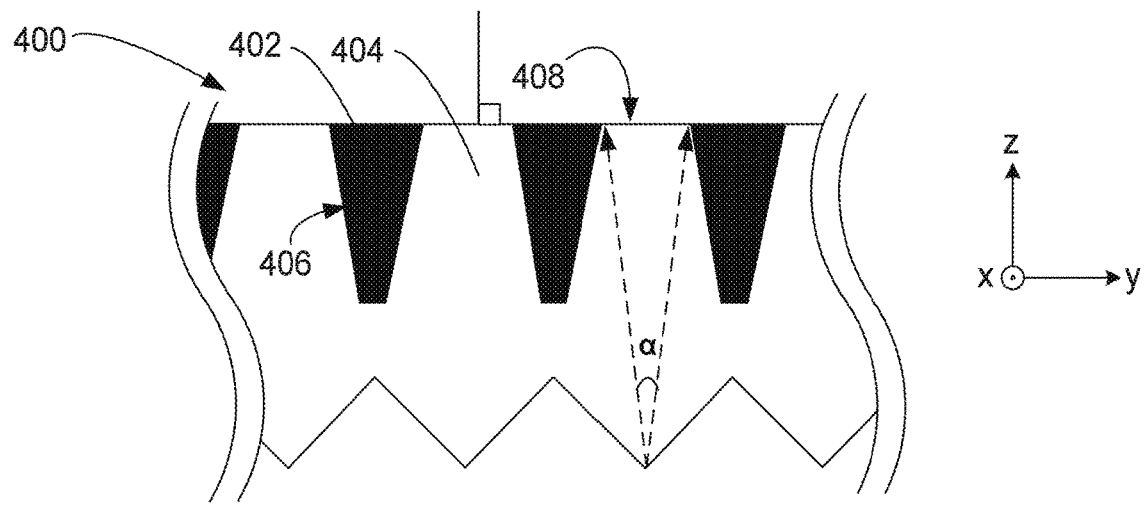
FIGS. 4A and 4B show examples of louver shapes that may be incorporated into LCF of FIG. 1.
Figure 4B:
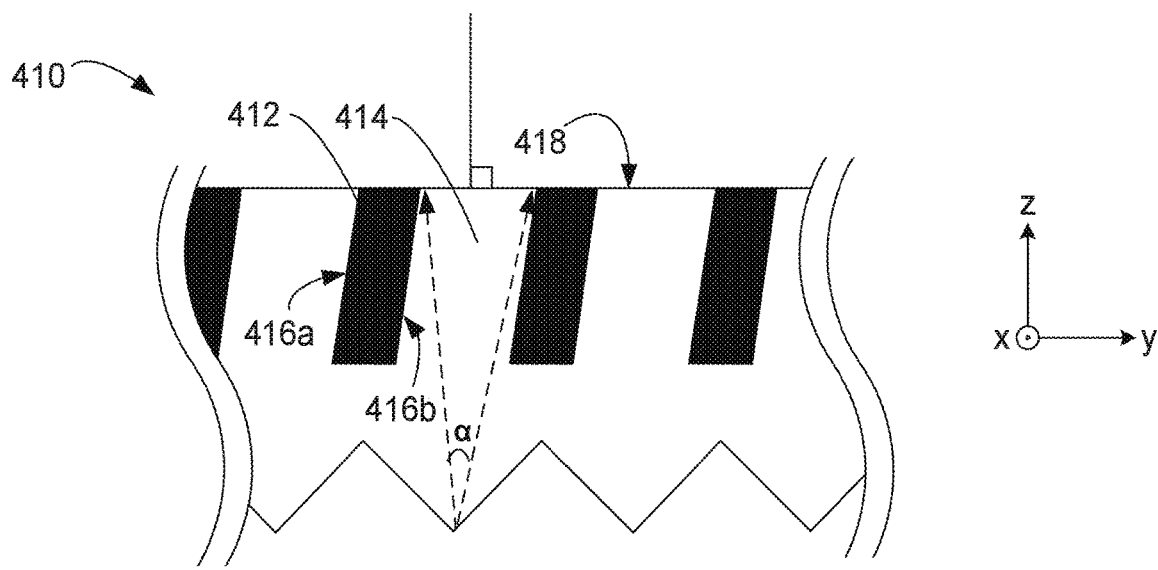

In some examples, the size, shape, and spacing of louvers 128 may be used to set the span of light output distribution angle ($\sigma$). FIGS. 4A and 4B show additional examples of louver shapes that may be incorporated into LCF 120 to adjust one or more parameters of transmission angle ($\alpha$) and as a result, light output distribution angle ($\sigma$). For example, FIG. 4A shows an LCF film 400 that includes louvers 402 with angled walls 406 such that the louvers have a trapezoidal cross-sectional shape separated by regions of transmissive material 404. In some examples walls 406 may be angled inward from first major surface 408 by up to about 5 degrees from the normal of first major surface 408. The larger the angle of the louver wall 406, the narrower the span of the resultant transmission angle ($\alpha$). For example, as shown in FIG. 4A, louvers 402 define a trapezoidal cross-section in an inverted orientation (e.g., with the base of the trapezoid facing up in the +z-axis direction). Such a configuration may increase the span of transmission angle ($\alpha$) as compared to an LCF that included louvers 402 in the opposite/upright orientation (e.g., with the base of the trapezoid facing down in the −z-axis direction). In some examples, the transmission angle ($\alpha$) may be about 20 degrees to about 70 degrees.

FIG. 4B shows an LCF film 410 that includes canted louvers 412 with asymmetrically angled walls 416a and 416b separated by regions of transmissive material 414. In some examples, the resultant construction of louvers 412 may be used to cant the transmission angle ($\alpha$) so that the resultant angle is no longer centered about the normal of first major surface 418. In some such examples, canted louvers 412 may be used to shift the resultant viewing angles (e.g., establish a cant angle) by up to about 15 degrees, and in some examples, up to about 5 degrees. For example, the resultant output distribution angle ($\sigma$) of light exiting LCF 410 may be, for example, 60 degrees but lovers 128 may be canted by 5 degrees to produce a characteristic set of viewing angles from −25 degrees to 35 degrees (e.g., a 60 degree spread with a 5 degree cant angle) as measured from the normal of first major surface 418.

In some examples, the distance between adjacent louvers 128 (e.g., width of transmissive regions 130 as measured in the y-axis direction) may be about on the millimeter or micrometer scale, for example, between 10 and 200 micrometers ($\mu$m) or between 10 and 100 $\mu$m. In some examples, the distance between adjacent louvers 128 may be about 20 to about 60 $\mu$m. In some examples, the louvers 128 may define a width of about 35 to about 50 micrometers (e.g., measured in the y-axis direction) and a height of about 50 to about 120 micrometers (e.g., measured in the z-axis direction).

Returning to FIG. 1, in some examples, the degree of efficiency of light generated by light source 110 that exits through first major surface 122 of LCF 120 may depended in part on the collimation angle ($\varphi$) of distribution cone 108. The span of distribution cone 108 may depend on one or more of the type of light source 110, the type of backlight assembly, the presence of any accompanying collimation/injection optics (e.g., a lightguide configured to deliver light from light source 110 to LCF 120), or the like. In some examples, the lightguide may allow for relatively uniform power density and output distribution across output surface 112 of light source 110.

In some examples, distribution cone 108 may represent a wedge. For example, when light source 110 includes a bank of parallel light sources, light distribution cones for the respective light sources may effectively merge to create an extended light distribution of roughly constant angular extent (for example, as if the cross-section of light distribution cone 108 were projected into/out of the page of FIG. 1). In some examples, the extended light distribution may have a relatively uniform power density and output distribution across output surface 112 of light source 110. In some examples, an extended light distribution may also be formed where light source 110 includes a linear light source, such as a CCFL tube. For explanatory purposes, light from light source 110 may be represented by light rays 102, which may be incident on second major surface 124 of LCF 120.

Light source 110 may be any suitable light source or combination of light sources. In some examples, light source 110 may include one or more light emitting diodes (LEDs). In some examples, light source 110 may be configured to emit substantially white light or have different components that each emit light of different wavelengths that may collectively recreate white light. "White" light may refer to any suitable desirable color point that may be perceived by a viewer as white light and may be adjusted or calibrated depending on the application of display assembly 100. In some examples, light source 110 may include cold cathode fluorescent lights (CCFLs) or incandescent light sources. The light sources and any corresponding injection, collimation, or other optics may be selected to provide any suitable wavelength or combination of wavelengths, polarizations, point spread distributions, and degrees of collimation.

In some examples, light source 110 may represent a backlight assembly that includes one or more light sources and lightguides. For example, light source 110 may include a lightguide disposed adjacent to second major surface 124 configured to receive light from one or more light sources. The lightguide may be a solid transparent optical component having a specific geometry and optical features that allows the lightguide to transports light by total internal reflection to provide control over the extraction of light along the length and/or width so that the light is evenly distributed across LCF 120 within collimation angle ($\varphi$). Certain extractor designs may be used to emit highly collimated light at a desired angle.

Microstructures 126 may be linear microstructures (e.g., prisms) such that microstructures 126 extend along a direction with substantially the same (e.g., the same or nearly the same) cross-sectional shape (e.g., as shown in the cross-sectional view of FIG. 1, and extending in the direction of the x-axis). In some examples, microstructures 126 may have an index of refraction higher than the material adjacent to second major surface 124 (e.g., air), thereby causing light rays 102 to be refracted but not substantially reflected by first side 132 of microstructures 136 where it is then refracted towards second side second side 134, except from Fresnel reflections at the interface of first side 132. In some examples, these Fresnel reflections may be reduced by providing an anti-reflection coating or treatment on second major surface 124 (e.g., on first and second sides 132 and 134 of microstructures 126). In some examples, anti-reflection may be provided by an antireflective structured surface, such as a moth's eye structure or the like.

First and second sides 132 and 134 of microstructures 126 may be any suitable shape or angle. In some examples, one or more of the sides 132 and 134 may have a surface that is non-planar (e.g., curved).

Microstructures 126 may be any appropriate size. In some examples, microstructures 126 may be on the millimeter or micrometer scale, for example, between 10 and 200 μm or between 10 and 100 μm. The pitch or size of microstructures 126 may increase, decrease, both increase and decrease, or remain constant for all or portions of second major surface 124 of LCF 120. In some examples, microstructures 126 may all be substantially the same (e.g., the same or nearly the same) or may include a combination of microstructures that are different shapes or sizes. The separation between microstructures 126 (e.g., peak to peak) may be substantially the same (e.g., the same or nearly the same) as the separation between louvers 128 (e.g., center to center) so that each louver is registered to a corresponding microstructure.

Microstructures 126 and louvers 128 may be formed using any suitable technique and materials. In some examples, as described further below, louvers 128 and microstructures 126 may be formed using a technique such as extrusion, cast-and-cure, or the like. For example, louvers 128 may be formed by the creation of regions of transmissive material 130 within a polymer film such that each region of transmissive material 130 is separated by slots. The slots may then be back filled with a light absorbing material to produce louvers 128. The light absorbing material can be any suitable material that functions to absorb or block light at least in a portion of the visible spectrum. In some examples, the light absorbing material can include a black colorant, such as carbon black. The carbon black may be a particulate carbon black having a particle size less than 10 microns, for example 1 micron or less. The carbon black may, in some embodiments, have a mean particle size of less than 1 micron. In some examples, the absorbing material forming louvers 128, (e.g., carbon black, another pigment or dye, or combinations thereof) can be dispersed in a suitable binder. Light absorbing materials may also include particles or other scattering elements that can function to block light from being transmitted through the light absorbing regions.

In some examples, louvers 128 may be designed to absorb as much of incident light as possible. Highly absorptive regions minimize the amount of light that may "leak" through louvers 128, and therefore help reduce light transmitted at non-desirable viewing angles. In some examples, it may also be desired to minimize light that is reflected from louvers 128 to reduce spurious or "ghost" images that can arise from such reflections. In some examples, unwanted reflections at the interfaces between louvers 128 and regions of transmissive material 130 may be controlled by matching the index of refraction of the light transmissive material 130 and the index of refraction of the light absorbing material (louvers 128) over at least a portion of the spectrum, for example the human visible spectrum, or having the index of refraction of the light transmissive material 130 lower than the index of refraction of the light absorbing material (louvers 128). When the refractive index of light transmissive material 130 is less than the refractive index of the absorptive region, light incident to the interface between them will be refracted into the absorptive region and absorbed. In some examples, the refractive indexes of the two regions (e.g., louvers 128 and light transmissive material 130) can be "matched" so that the louver refractive index is slightly higher than (if not equal) to the light transmissive material 130, and reflections are essentially eliminated. Unfortunately, the portion of light which is absorbed reduces the total light transmitted through LCF 120, and it may be desirable to redirect a portion of this absorbed light, without altering the angle of light output distribution 136.

In some examples, the brightness of the display can be increased when some of the incident light undergoes total internal reflections (TIR) from the interface between light transmissive material 130 and louvers 128. Whether a light ray will undergo TIR or not, can be determined from the incidence angle with the interface, and the difference in refractive index of the materials used in the transmissive and absorptive regions. In some examples, the refractive index of louvers 128 is no greater than the refractive index of light transmissive material 130. In some cases, the index of refraction of the light transmissive material 130 may be greater than the index of refraction of louvers 128 by at least about 0.005. In some cases, the difference between the indexes is less than 0.1. In some cases, the difference between the indexes is between about 0.007 and about 0.06. As used herein, 25 "between" two numbers in a range is meant to include the endpoints of the range.

Regions of transmissive material 130 as well as microstructures 126 may include any suitable optically transmissive material. In some examples transmissive material 130 and microstructures 126 may include a polymerizable resin. In some examples, the polymerizable resin can comprise a combination of first and second polymerizable components selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some examples, the polymerizable composition can comprise a (meth)acrylated urethane oligomer, (meth)acrylated epoxy oligomer, (meth)acrylated polyester oligomer, a (meth)acrylated phenolic oligomer, a (meth)acrylated acrylic oligomer, and mixtures thereof. The polymerizable resin can be a radiation curable polymeric resin, such as a UV curable resin. In some examples, transmissive material 130 and microstructures 126 may be formed from a polymeric material, such as polycarbonate, polyethylene terephthalate, polyethylene naphthalate, poly(methyl methacrylate) and copolymers and blends of the same. In some examples, the transmissive regions of LCF 120 may be optically transparent or have low haze and high clarity to avoid undesirably scattering incident light. In some examples, LCF 120 may have a sufficiently high index of refraction, such as at least about 1.45, to ensure that total internal reflection occurs at a sufficiently broad range of angles. Other appropriate materials include acrylics, polystyrenes, methyl styrenes, acrylates, polypropylenes, polyvinyl chlorides, and the like. In some examples the material, dimensions, or both of LCF 120 may be selected in order to produce a flexible film.

Microstructures 126 and louvers 128 of LCF 120 may be formed through any suitable process. For example, louvers 128 and microstructures 126 may be formed as independent films using a microreplication process. Films of optical material may be passed through a suitable cutting tool having the negative of the desired microstructures 126 or louvers 128 on the tool and pressing a compliant but curable or hardenable optical material against the tool surface. The material may be subsequently hardened or cured (for example, through exposure to light such as ultraviolet light), leaving the corresponding microstructures 126 or slots for forming louvers 128 imprinted on the respective film.

Figure 5:
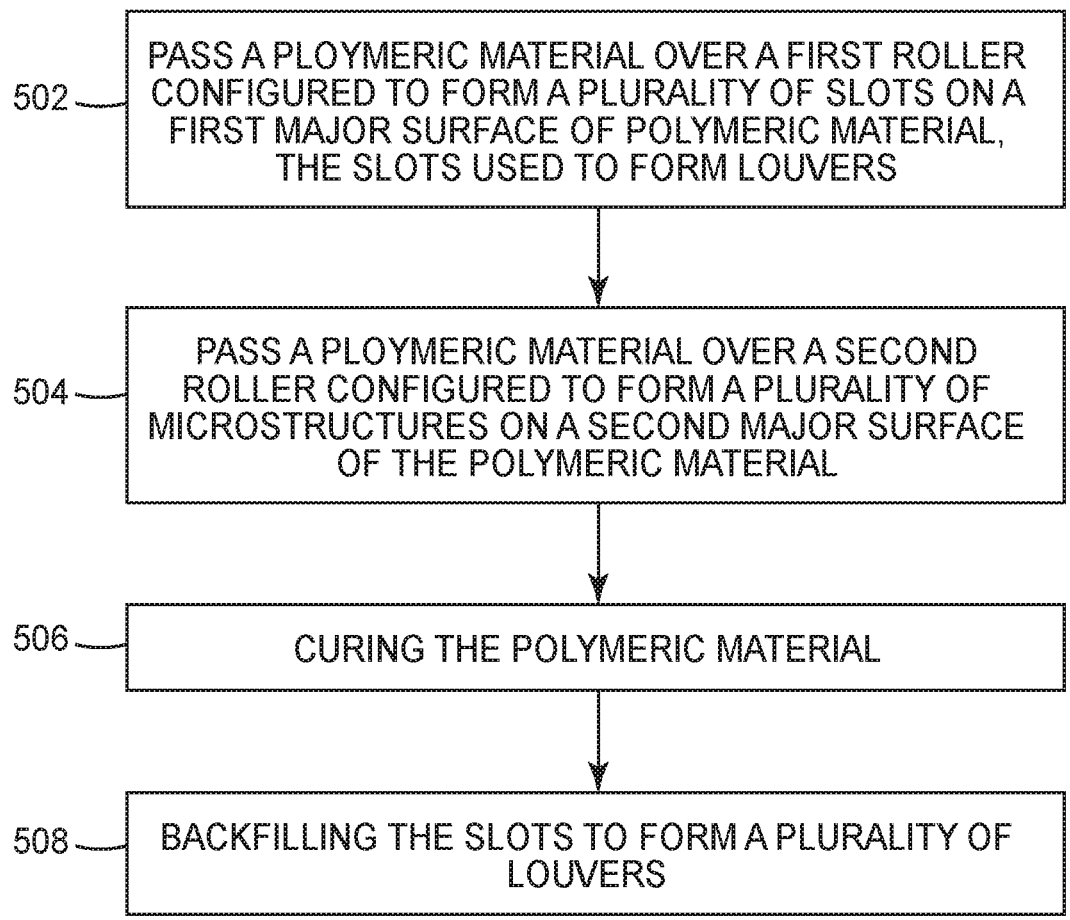
FIG. 5 shows an example technique using a continuous cast and cure process technique for forming an LCF having louvers and microstructures on opposite sides of a single optical film.
Figure 6:
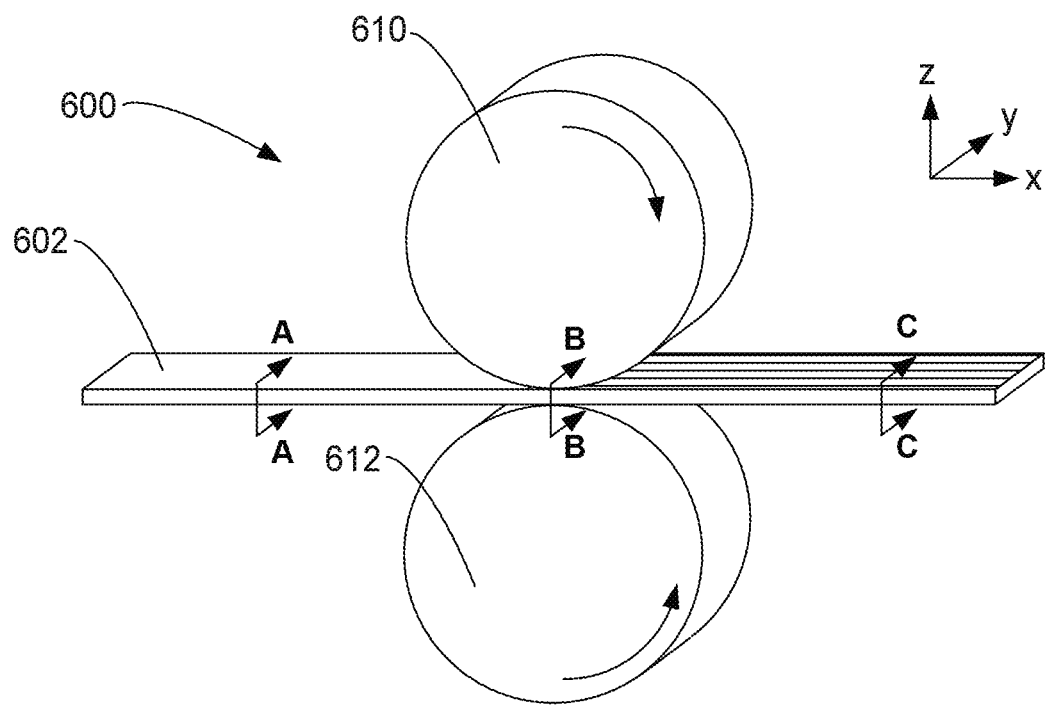
FIG. 6 is an example apparatus that may be used to implement the techniques described in FIG. 5.
Figure 7A:
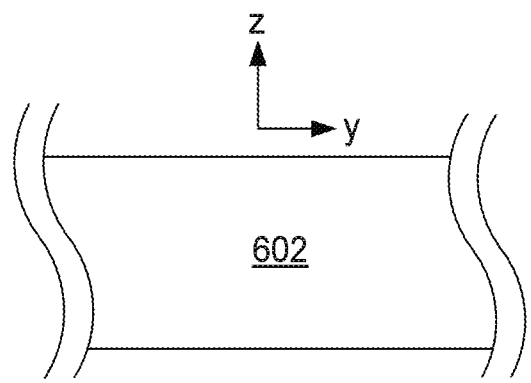
FIGS. 7A-7C show example cross sections of the polymeric material shown in FIG. 6.
Figure 7B:
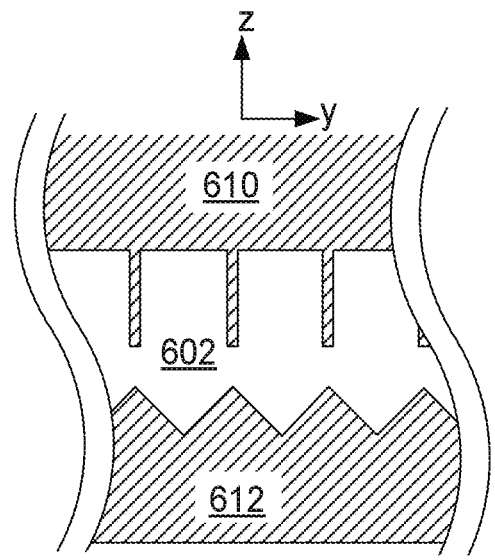
Figure 7C:
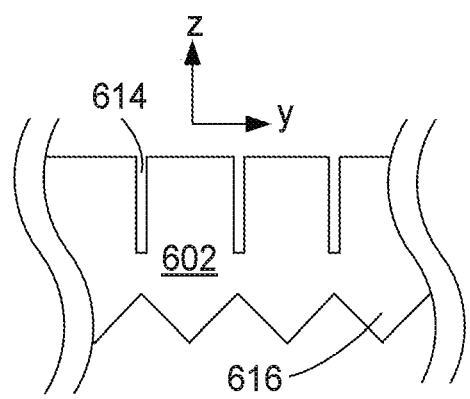

In other examples, microstructures 126 or louvers 128 may be formed on opposite sides of the same film using a continuous cast and cure process. For example, FIG. 5 illustrates an example continuous cast and cure process technique for forming louvers and microstructures on opposite sides of a single optical film. FIGS. 6 and 7A-7C show an example apparatus 600 to assist in the described techniques of FIG. 5, with FIGS. 7A, 7B, and 7C showing cross sections of the LCF (e.g., polymeric material 602) across the y-z plane for points A-A, B-B, and C-C respectively, representing at various points during the processing of the LCF.

The technique of FIG. 5 includes passing a polymeric material 602 over a first roller 610 configured to form a plurality of slots 614 in a first major surface of polymeric material 602 (502), passing the polymeric material 602 over a second roller 612 configured to form a plurality of microstructures 616 on a second major surface of polymeric material 602, opposite of the first major surface (504), curing the polymeric material 602 (506), and backfilling slots 614 with a light absorbing material to from a plurality of louvers (e.g., louvers 128 of FIG. 1) (508).

As described above, polymeric material 602 may be any suitable material that may be used to construct microstructures and transmissive regions of the resultant LCF (e.g., LCF 120). Suitable materials may include, for example, polycarbonate, polyethylene terephthalate, polyethylene naphthalate, poly(methyl methacrylate) and copolymers and blends of the same.

Rollers 610 and 612 may be formed using any suitable technique to create the negative slot and microstructure patterns on the respective roller surfaces. In some examples, rollers 610 and 612 may be formed by, for example, thread cutting the array structure into a surface of a cylindrical blank, or roll. In some examples, polymeric material 602 may be passed through rollers 610 and 612 simultaneously (e.g., nip rolled) or in close proximity (e.g., in sequence during the same rolling pass) to ensure that microstructures 616 are registered to the corresponding slots 614.

Once slots 614 and microstructures 616 are formed on opposite surfaces of polymeric material 602, the polymeric film material may be cured and the slots can be backfilled with a light absorbing material to from a LCF as described above.

Other processes for forming LCF 120 may also be possible including, for example, casting and curing with an electroplated, laser cut, or etched tool, using photolithography such as two-photon mastering of a tool in conjunction with a cast and cure process, or even direct machining or an additive three-dimensional printing processor.

Figure 8:
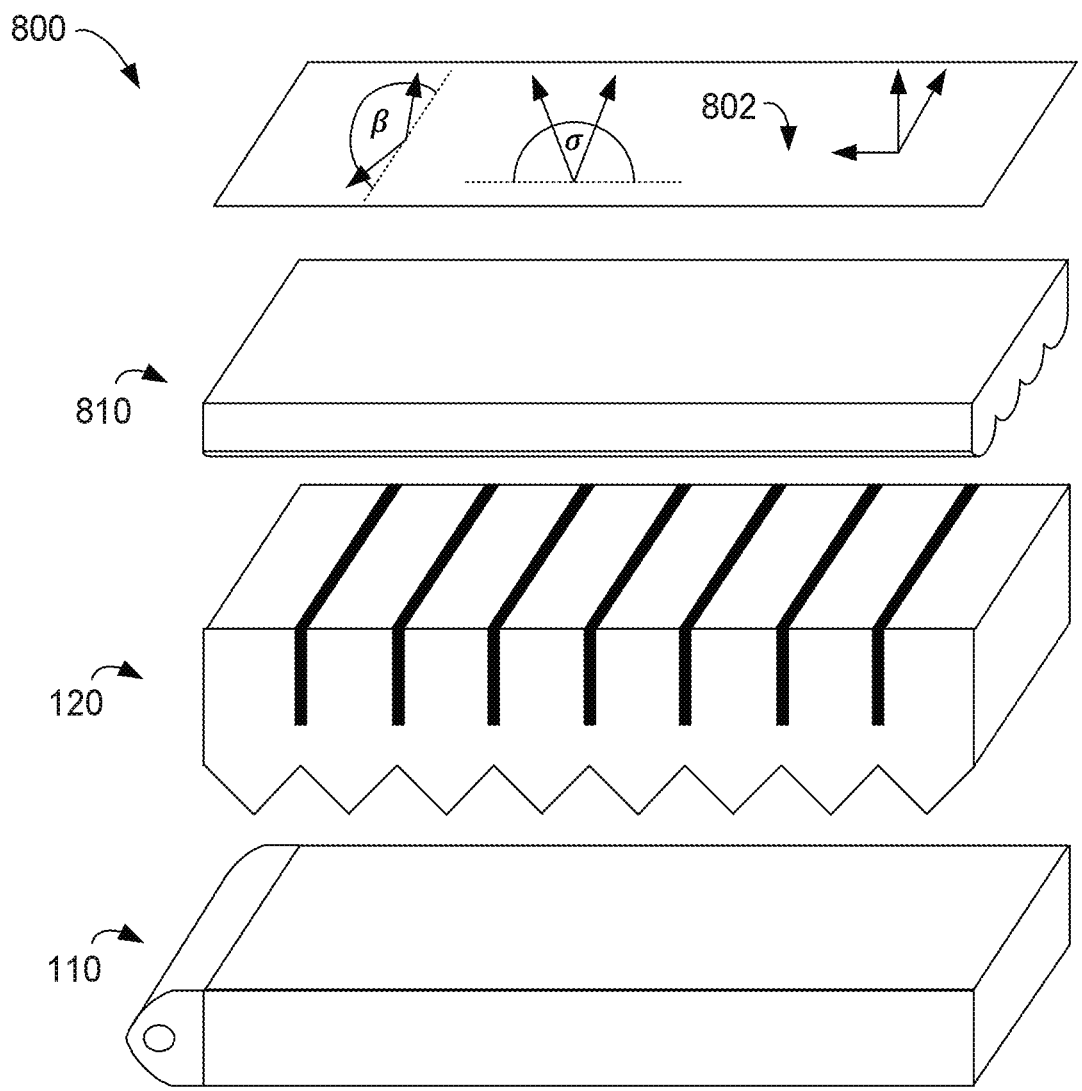
FIG. 8 is a schematic side elevation cross-section of an example display assembly that includes a light source, the LCF of FIG. 1, and a diffuser film.
Figure 9:
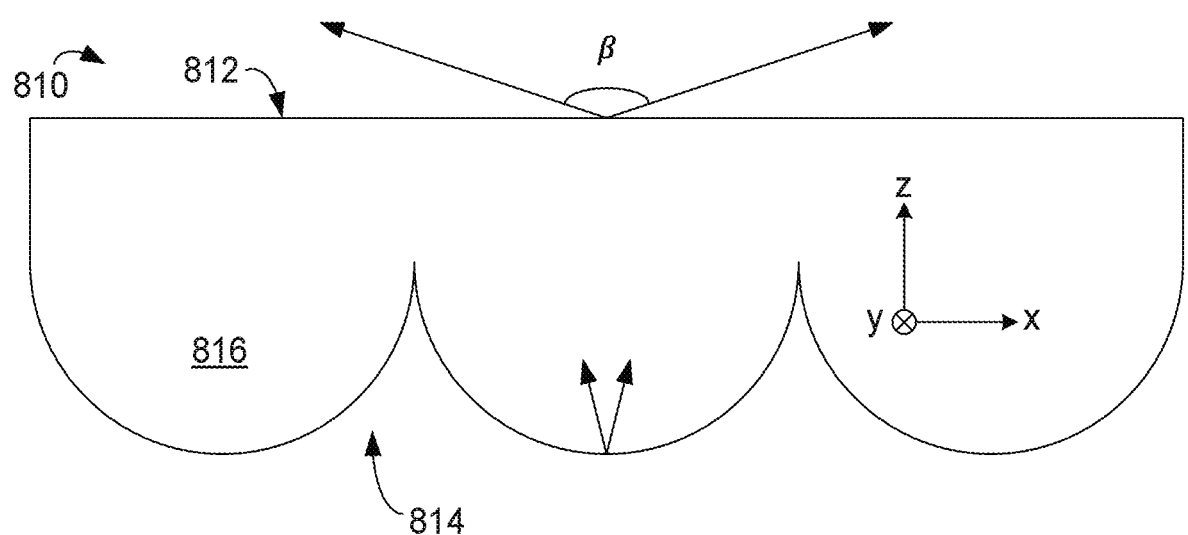
FIG. 9 is an enlarged view of the diffuser film of FIG. 8 for illustrating several of the features of the film.

In some examples, display assembly 100 may include one or more additional films or optical layers including, for example, an LCD display assembly (not shown). In some examples, display assembly 100 may include an additional optical film configured to control the light output distribution within the x-z plane. For example, FIG. 8 is a schematic side elevation cross-section of another example display assembly 800 that includes light source 110, LCF 120, and a diffuser film 810 configured to control the light output distribution from LCF 120 within the y-z plane (e.g., the plane substantially perpendicular to the y-z plane controlled by LCF 120). FIG. 9 provides an enlarged view of diffuser film 810 for illustrating several of the features of the film.

In some examples, diffuser film 810 may define a first substantially smooth surface 812 (e.g., non-structured) and second structured major surface 814 opposite the first.

In some examples, diffuser film 810 may be oriented such that second structured major surface 814 is set to receive light from the first major surface 122 of LCF 120, with the light exiting diffuser film 810 through first substantially smooth surface 812. In some examples, such an orientation may help reduce the retro-reflection of light in diffuse film 810.

Alternatively, first substantially smooth surface 812 may be oriented to receive light from the first major surface 122 of LCF 120, such that the light exiting diffuser film 810 exits through second structured major surface 814. In some examples, first substantially smooth surface 812 may be optically coupled to first major surface 122 (e.g., adhered to first major surface 122 such that light transmits from LCF 120 to diffuser film 810 without undergoing a significant reflection or refraction). In some such examples, optically coupling the LCF 120 to diffuser film 810 may help reduce unwanted reflections from first substantially smooth surface 812 of diffuser film 810.

The structured surface 814 may include a plurality of lenticular microstructures 816 each having curved face configured to diffuse (e.g., spread) light within the x-z plane that travels through the film and exits out structured surface 814. In some examples, each of lenticular microstructures 816 may be linearly extended along a direction substantially perpendicular (e.g., perpendicular or nearly perpendicular) to microstructures 126 and louvers 128.

Any suitable curved face may be used to create lenticular microstructures 816 having a desired x-z output distribution (e.g., angle (β)). In some examples, suitable cross-sectional shapes for lenticular microstructures 816 (e.g., as shown in the cross-sectional view of FIG. 9) may include, for example, parabolic, semi-circular, catadioptric shapes, and the like.

In some examples, such as automotive display units, diffuser film 810 may be used to diffuse light within the horizontal plane (as opposed to the vertical plane of LCF 120) so that a display image is projected to the different occupants of the vehicle. The spread within the x-z plane that exits display surface 802 may be characterized by a set of x-z characteristic viewing angles within distribution angle (β) (e.g., FIG. 8). In some examples, distribution angle (β) may be greater than the y-z collimation distribution angle (σ) such that display assembly 800 provides a relatively large set of x-z characteristic viewing angles in the x-z plane and a relatively narrow set of y-z characteristic viewing angles in the y-z plane. In some such examples, the x-z plane may represent the horizontal plane and the y-z plane may represent the vertical plane as observed by a viewer.

Diffuser film 810 may be any suitable thickness and may be made from any suitable material. In some examples, diffuser film 810 may formed from a polymeric material, such as polycarbonate, polyethylene terephthalate, polyethylene naphthalate, poly(methyl methacrylate) and copolymers and blends of the same. Other appropriate materials include acrylics, polystyrenes, methyl styrenes, acrylates, polypropylenes, polyvinyl chlorides, and the like. In some examples, diffuser film 810 may be formed of substantially the same polymeric material as the transmissive regions of LCF 120.

In some examples, the resultant light output distribution within the x-z plane as a result of diffuser film 810 may result in a set of x-z characteristic viewing angles defining a viewing half-angle between about 30 degrees (e.g., β equal to about 60 degrees, or viewing angles −30 to +30 degrees) and about 60 degrees (e.g., β equal to about 120 degrees, or viewing angles −60 to +60 degrees) as measured from the normal to display surface 802, which may be substantially aligned with normal 104 of LCF 120.

In some examples, at least 80% of light originating from light source 110 and exiting through diffuser film 810 will be within the set of x-z characteristic viewing angles defined by distribution angle (β).

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A display assembly comprising:
 a backlight defining a light output surface;
 a light control film disposed adjacent to the light output surface, the light control film comprising: a substrate defining first and second major surfaces, wherein the first major surface comprises a plurality louvers spanning in a first direction substantially perpendicular to a normal of the first major surface, wherein the second major surface comprises a plurality of linear microstructures spanning in the first direction, and
 a diffuser film comprising a first substantially smooth major surface and a second structured surface, the second structured surface comprising a plurality of lenticular prisms, wherein the lenticular prisms are aligned substantially perpendicular to the plurality of louvers, wherein light exiting the first major surface of the light control film, enters the diffuser film and exits through one of the first substantially smooth major surface or the second structured surface,
 wherein light from the backlight exits the light output surface and enters the second major surface of the light control film and exits through the first major surface.

2. The display assembly of claim 1, wherein light exiting the first major surface of the light control film defines a first set of characteristic viewing angles in a first plane perpendicular to the first direction, wherein the first set of characteristic viewing angles defines a viewing half-angle of about 20 to about 70 degrees as measured from the normal of the first major surface of the light control film.

3. The display assembly of claim 2, wherein at least 90% of light originating from the backlight and exiting through the first major surface is included in first set of characteristic viewing angles.

4. The display assembly of claim 1, wherein the viewing half-angle of the first set of characteristic viewing angles is between about 20 degrees and about 30 degrees.

5. The display assembly of claim 1, wherein at least 85% of light originating from the backlight exits through the first major surface of the light control film.

6. The display assembly of claim 1, wherein each louver of the plurality of louvers substantially aligns with a corresponding microstructure of the plurality of microstructures.

7. The display assembly of claim 1, wherein the plurality of louvers define a width of about 20 μm to about 100 μm between adjacent louvers.

8. The display assembly of claim 1, wherein the plurality of louvers define a louver width of about 30 μm to about 50 μm between adjacent lovers.

9. The display assembly of claim 1, wherein each microstructure of the plurality of microstructures define a microstructure width of about 20 μm to about 100 μm.

10. The display assembly of claim 1, wherein the louver width and the microstructure width are substantially the same.

11. The display assembly of claim 1, wherein the plurality of louvers define a cant angle of about 0 to about 5 degrees.

12. The display assembly of claim 1, wherein the plurality of louvers comprise a light absorbing material, wherein each louver is separated by a light transmissive material.

13. The display assembly of claim 12, wherein the plurality of microstructures comprise the light transmissive material.

14. The display assembly of claim 1, wherein the light exiting the first major surface of the light control film, enters the first substantially smooth major surface of the diffuser film and exits the second structured surface of the diffuser film.

15. The display assembly of claim 14, wherein the first substantially smooth major surface of the diffuser film is optically coupled to the first major surface of the light control film.

16. The display assembly of claim 1, wherein the light exiting the first major surface of the light control film, enters the second structured surface of the diffuser film and exits the first substantially smooth major surface of the diffuser film.

17. The display assembly of claim 1, wherein light exiting through the first substantially smooth major surface or the second structured surface of the diffuser film defines a second set of characteristic viewing angles in a second plane substantially perpendicular to the first plane, wherein the second set of characteristic viewing angles defining a viewing half-angle between about 30 degrees and about 60 degrees as measured from the normal of the first major surface of the light control film.

18. The display assembly of claim 17, wherein at least 80% of light originating from the backlight and exiting through the diffuser film is within the second set of characteristic viewing angles.

19. The display assembly of claim 17, wherein the first set of characteristic viewing angles corresponds to a vertical plane and the second set of characteristic viewing angles corresponds to a horizontal plane.

20. A method of forming a light control film comprising:
  forming a plurality of slots on a first surface of a polymeric material;
  forming a plurality of linear microstructures on a second major surface of the polymeric material;
  curing the polymeric material;
  backfilling the slots with a light absorbing material to form a plurality of louvers on the second major surface; and
  registering each louver with a corresponding linear microstructure.

21. The method of claim 20, wherein forming the plurality of slots comprises:
  passing the polymeric material over a first roller configured to form the plurality of slots in the first major surface of the polymeric material;
  a rolling first die to form a plurality of slots on the first surface of the light control film backfilling the plurality of slots with a light absorbing material to from the plurality of louvers.

22. The method of claim 20, wherein forming the plurality of linear microstructures comprises:
  passing the polymeric material over a second roller configured to form the plurality of microstructures on the second major surface of the polymeric material.

23. A light control film comprising:
  a louver film comprising a plurality of louvers comprising a light absorbing material, each louver separated by a light transmissive material, the louver film defining a first major surface of the light control film;
  a turning film comprising a plurality a of linear microstructures forming a second major surface of the light control film, wherein each linear microstructure is substantially aligned with a corresponding louver; and
  an optically transmissive layer between the louver film and the turning film;
  wherein the light transmissive material, the optically transmissive layer, and the turning film are all formed as a single seamless film.

24. The light control film of claim 23, wherein the light transmissive material, the optically transmissive layer, and the turning film are all formed from the same polymeric material.

* * * * *